United States Patent
Wu et al.

(10) Patent No.: US 11,630,530 B2
(45) Date of Patent: Apr. 18, 2023

(54) OPTICAL ADHESIVE BONDING ENHANCING TOUCH PANEL WITH HEATER

(71) Applicant: EMERGING DISPLAY TECHNOLOGIES CORP., Kaohsiung (TW)

(72) Inventors: Han-Tsung Wu, Kaohsiung (TW); Po-Tsun Liu, Kaohsiung (TW); Chao-Ping Wu, Kaohsiung (TW)

(73) Assignee: EMERGING DISPLAY TECHNOLOGIES CORP., Kaohsiung (TW)

( * ) Notice: Subject to any disclaimer, the term of this patent is extended or adjusted under 35 U.S.C. 154(b) by 0 days.

(21) Appl. No.: 17/703,637

(22) Filed: Mar. 24, 2022

(65) Prior Publication Data
US 2022/0317797 A1    Oct. 6, 2022

(30) Foreign Application Priority Data

Apr. 1, 2021 (TW) .................................. 110203547

(51) Int. Cl.
*G06F 3/041* (2006.01)
*H05B 3/20* (2006.01)

(52) U.S. Cl.
CPC ............. *G06F 3/0412* (2013.01); *H05B 3/20* (2013.01); *H05B 2203/013* (2013.01); *H05B 2203/017* (2013.01)

(58) Field of Classification Search
None
See application file for complete search history.

(56) References Cited

U.S. PATENT DOCUMENTS

2017/0090240 A1* 3/2017 Liu ................... G02F 1/133382

* cited by examiner

*Primary Examiner* — Brian M Butcher
(74) *Attorney, Agent, or Firm* — Birch, Stewart, Kolasch & Birch, LLP (57) ABSTRACT

The present invention is a touch panel with a heater for enhancing the bonding of optical adhesive, which comprises a cover lens and a sensing substrate mutually bonded by optical adhesive, wherein at least one heating electrode is configured on the other side of the sensing substrate. The heating electrode is formed by printing an opaque conductive material with a plurality of openings formed thereon and through which light is allowed to pass. When ultraviolet light is irradiating from one side of the heating electrode to the direction of the cover lens, the ultraviolet light can penetrate the optical adhesives through the openings on the heating electrode, so that the optical adhesives are effectively cured by the irradiation, and the bonding strength between the cover lens and the sensing substrate is improved.

18 Claims, 11 Drawing Sheets

OPTICAL ADHESIVE BONDING ENHANCING TOUCH PANEL WITH HEATER

CROSS REFERENCE TO RELATED APPLICATION(S)

This non-provisional application claims the benefit under 35 U.S.C. § 119(e) to patent application No. 110203547 filed in Taiwan on Apr. 1, 2021, which is hereby incorporated in its entirety by reference into the present application.

BACKGROUND OF THE INVENTION

1. Field of the Invention

The present invention relates to a touch panel, especially to a touch panel with a heater.

2. Description of the Related Art

A touch display device mainly includes a stacked liquid crystal display panel and a touch panel, the liquid crystal display panel is used for displaying image information, and the touch panel is used as a user interface for receiving a user's input of touch instructions. The liquid crystal display panel contains liquid crystal molecules which, in a low temperature environment for example −30° C. ~ −40° C., cannot operate normally and result in faded or blank images. Moreover, when a temperature difference between interiors and surroundings of the liquid crystal display panel is too large, fog tends to form on a glass surface of the liquid crystal display panel, affecting visual perception of images.

In order to overcome the abnormal display problems caused by a low temperature, a heater is configured on a touch panel stacked on a liquid crystal display panel to increase the temperature of the liquid crystal display panel. Please refer to FIG. 7, which shows a conventional touch panel with heating function including a transparent cover lens 100 and a sensing substrate 102. An opaque ink material is coated along borders of a lower surface of the cover lens 100 to form an annular light-shielding layer 101. Touch sensing electrodes and circuit lines are formed on an upper surface of the sensing substrate 102, and silver paste material can be printed on borders of a lower surface of the sensing substrate 102 to form heating electrodes 103 that are in the shape of straight strips or are L-shaped. By suppling power to the heating electrodes 103, the heating electrodes 103 generate heat to produce heating effects.

Figure 7:
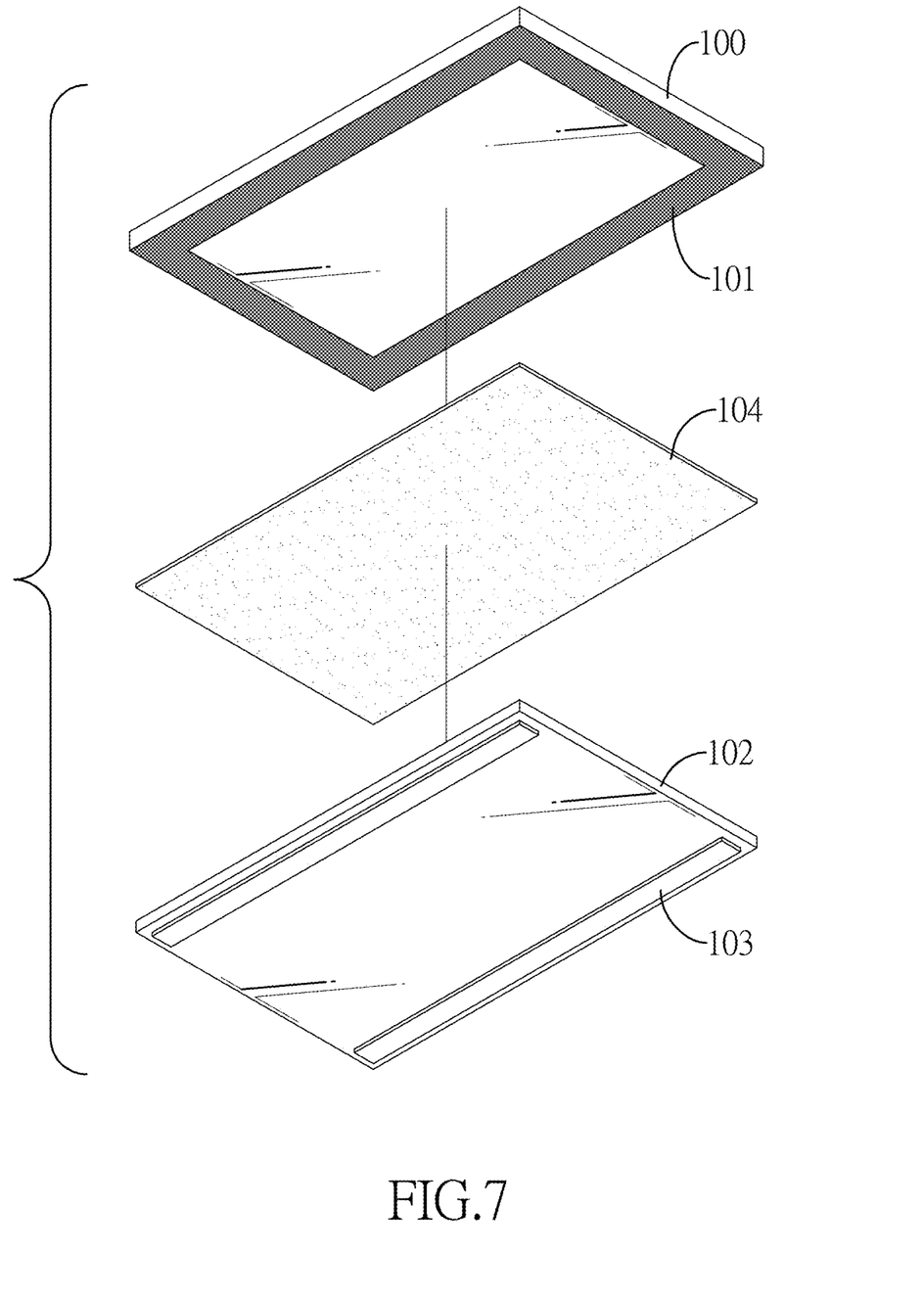
FIG. 7 is an exploded perspective view of a conventional touch panel with heating function.

The above-mentioned cover lens 100 and sensing substrate 102 are bonded to each other using transparent optical adhesive 104, e.g. Optical Clear Resin (OCR) or Optical Clear Adhesive (OCA). Specifically, the optical adhesive 104 is disposed between the lower surface of the cover lens 100 and the upper surface of the sensing substrate 102. After the cover lens 100 and the sensing substrate 102 are aligned and stacked, ultraviolet (UV) light is directionally irradiating from the lower surface of the sensing substrate 102 to the cover lens 100; thereafter, the optical adhesive 104 can be cured by the irradiating ultraviolet light to achieve the bonding effects.

However, the material of the heating electrode 103 is silver paste which is opaque, therefore the ultraviolet light will be blocked by the silver paste and cannot penetrate the sensing substrate 102, so that the optical adhesive 104 corresponding to the heating electrode 103 area cannot be irradiated by the ultraviolet light, and the curing effect is largely diminished. Accordingly, the bonding strength between the cover lens 100 and the sensing substrate 102 is significantly reduced.

SUMMARY OF THE INVENTION

An optical adhesive bonding enhancing touch panel with a heater of the present invention can improve the degree of curing of the optical adhesives in the touch panel by enhancing the bonding strength of the optical adhesives. The optical adhesive bonding enhancing touch panel with a heater of the present invention includes:

a sensing substrate, having an upper surface and a lower surface, and a plurality of sensing electrodes and signal lines formed on the upper surface;

a cover lens, having a lower surface, and an opaque light-shielding layer coated along borders of the lower surface of the cover lens to form a light-shielding layer, and the lower surface of the cover lens bonded to the upper surface of the sensing substrate via an optical adhesive layer;

at least one heating electrode configured under the sensing substrate, and the at least one heating electrode formed by printing with an opaque conductive material, and a plurality of openings formed on the heating electrode for light to pass through.

Since a plurality of openings are formed on the heating electrode, when ultraviolet light is irradiated from one side of the heating electrode toward the cover lens, the ultraviolet light can pass through the openings on the heating electrode and irradiate to the optical adhesive. The ultraviolet light is not completely blocked by the heating electrode, thus curing of the optical adhesive exposed to the ultraviolet light can be improved and the bonding strength is thereby enhanced.

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of, not all of, the embodiments of the present invention. Based on the embodiments of the present invention, all other embodiments obtained by a person of ordinary skill in the art without creative efforts shall fall within the protection scope of the present invention.

Figure 1:
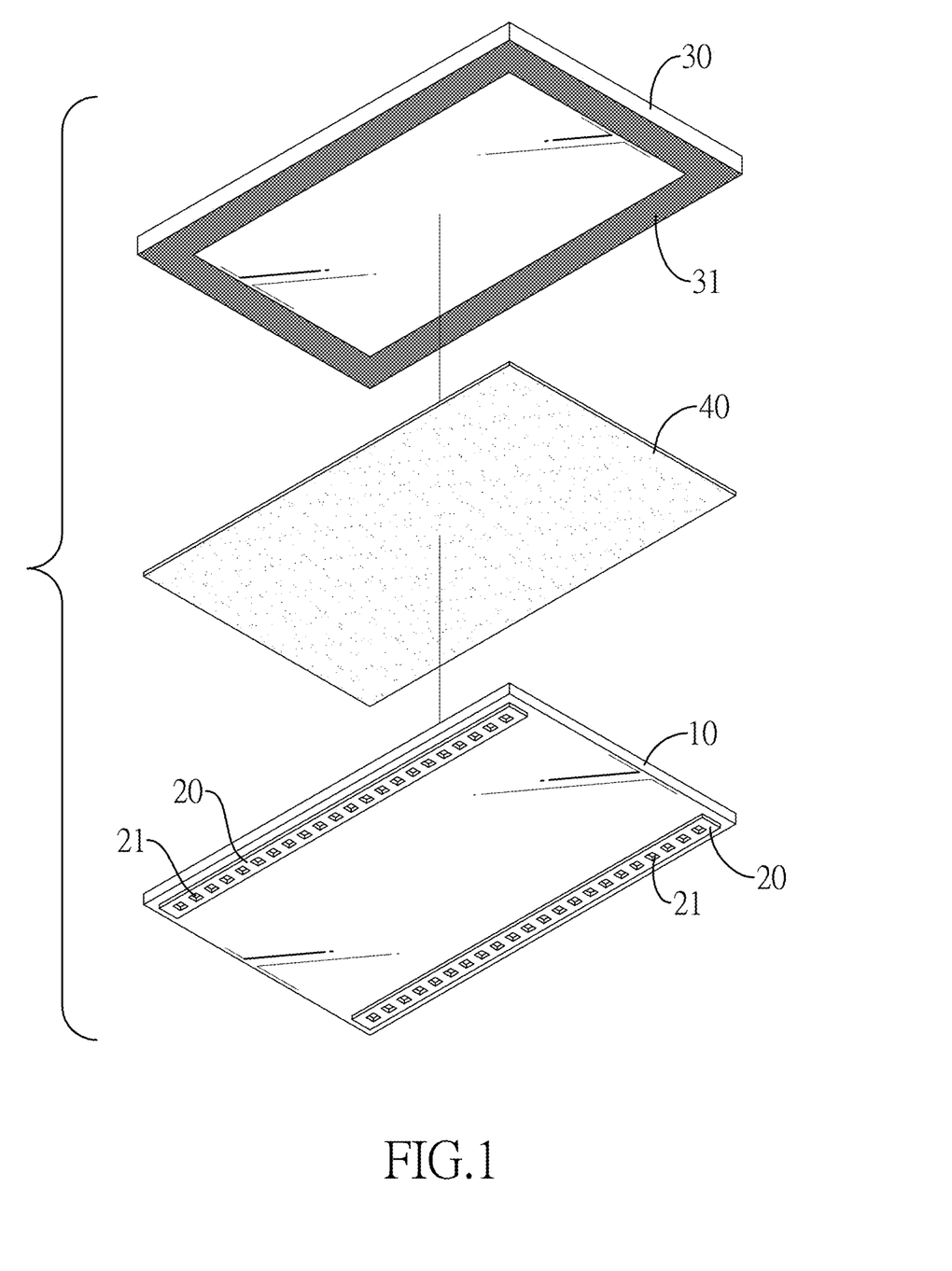
FIG. 1 is an exploded perspective view of a first embodiment of the present invention of the touch panel with a heater.

Please refer to FIG. 1, which shows a first embodiment of the present invention of a touch panel with a heater. Wherein, the touch panel with a heater includes a sensing substrate 10, at least one heating electrode 20, a cover lens 30 and optical adhesive 40.

The sensing substrate 10 is mainly composed of a substrate of transparent material, and has an upper surface and a lower surface opposite to each other. A plurality of sensing electrodes and signal lines are formed on the upper surface of the sensing substrate 10. The plurality of sensing electrodes of the sensing substrate 10 are used for sensing a touch of an external object (such as a finger, a stylus) with the sensing substrate 10, and a sensing signal is generated accordingly. Afterwards, the sensing signal is outwardly transmitted to a data calculating circuit through the signal lines.

Figure 2:
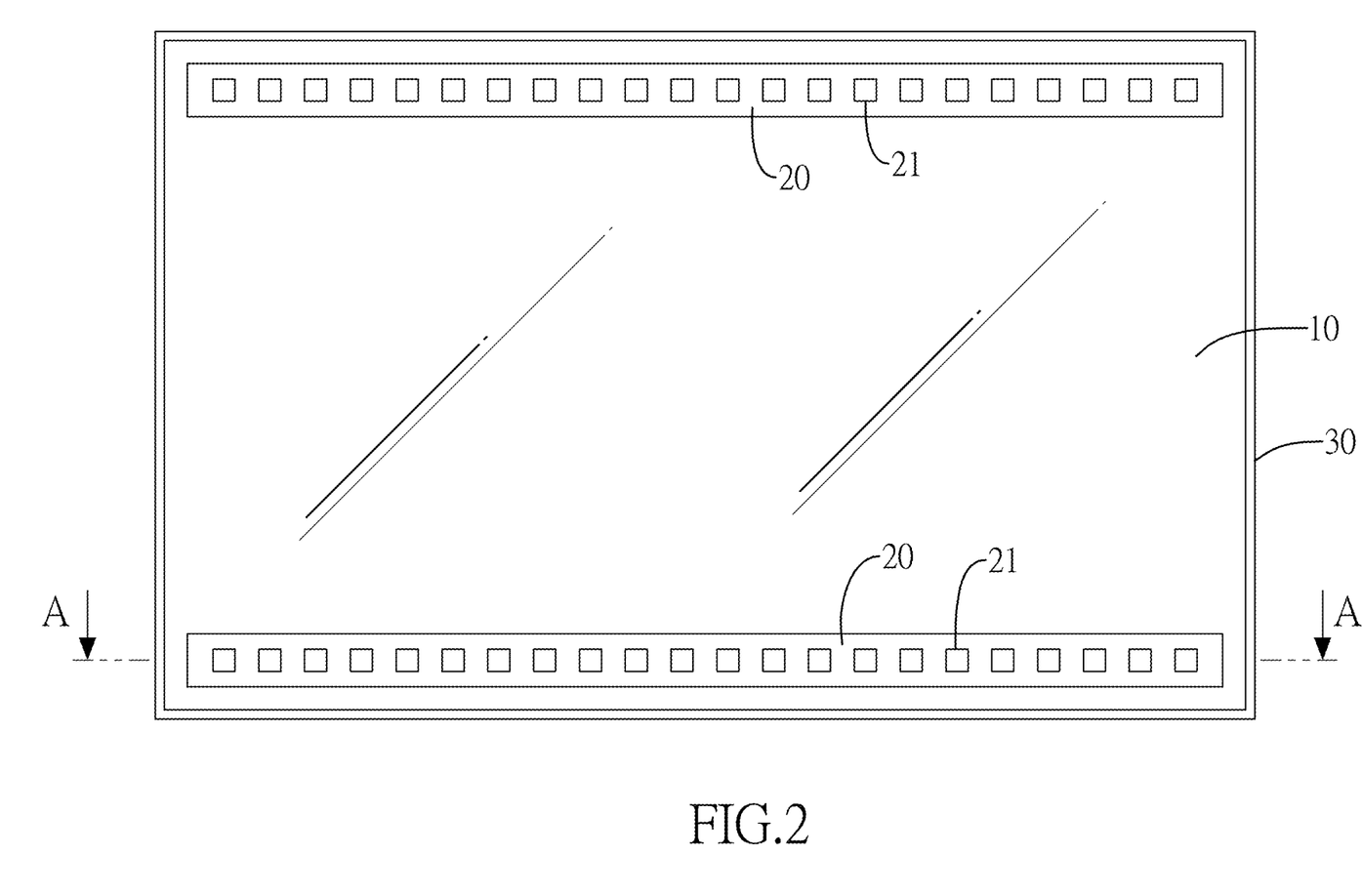
FIG. 2 is an embodiment of the present invention for forming openings on heating electrodes of the touch panel.
Figure 3:
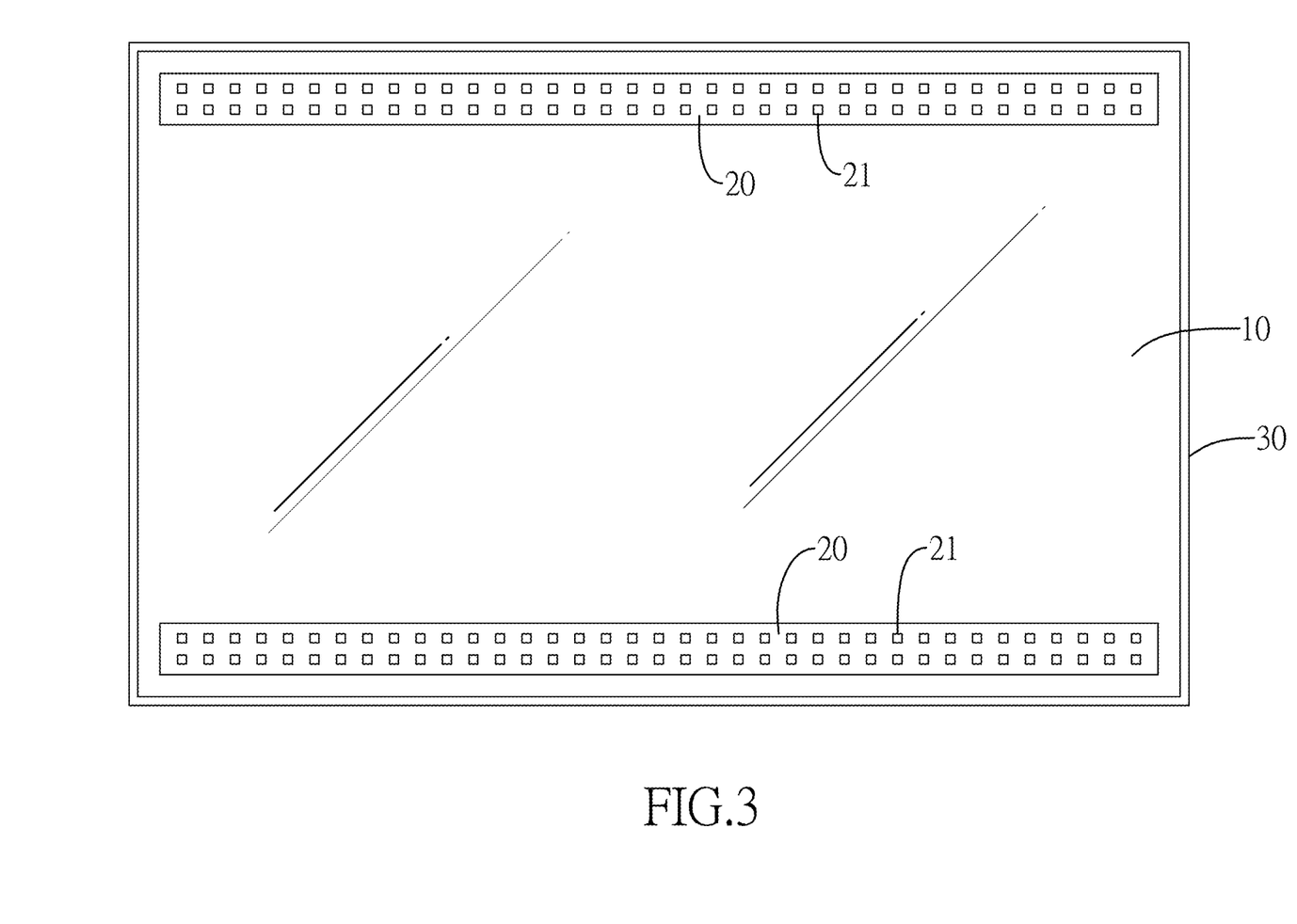
FIG. 3 is another embodiment of the present invention for forming openings on the heating electrodes.

The at least one heating electrode 20 is disposed under the sensing substrate 10. In this embodiment, the at least one heating electrode 20 is configured along the border of the lower surface of the sensing substrate 10. FIG. 1 takes two heating electrodes 20 as an example. Each heating electrode 20 can be in a shape of a straight stripe, or can be L-shaped, etc., and the material constituting the heating electrode 20 being opaque conductive material, such as silver paste, is formed on the lower surface of the sensing substrate 10 by printing. The present invention forms a plurality of openings 21 on each of the heating electrodes 20. The sizes and shapes of the openings 21 are not limited, as long as the two ends of the heating electrodes 20 are still connected and the openings 21 do not cause the heating electrodes 20 to form an open circuit. FIGS. 2 and 3 respectively show openings 21 in different numbers, positions and sizes. The plurality of openings 21 are preferably evenly disposed on each heating electrode 20. A heating electrode 20 may have openings 21 of the same size or different sizes; in addition, a heating electrode 20 may have openings 21 in the same shape or different shapes. Wherein, when printing the silver paste material, the openings 21 can be formed at preset positions by not printing the silver paste material thereon, and accordingly, the lower surface of the sensing substrate 10 is directly exposed through the openings 21.

The cover lens 30 is disposed above the sensing substrate 10, the cover lens 30 has a lower surface, an annular light-shielding layer 31 is formed along border of the lower surface, and the middle area not covered by the light-shielding layer 31 is a visible area. The light-shielding layer 31 is formed by printing opaque ink on the lower surface of the cover lens 30 to shield the signal lines on the sensing substrate 10 and the heating electrodes 20 below.

The optical adhesive 40 is disposed between the lower surface of the cover lens 30 and the upper surface of the sensing substrate 10, and is respectively bonded to the cover lens 30 and the sensing substrate 10.

Figure 4:
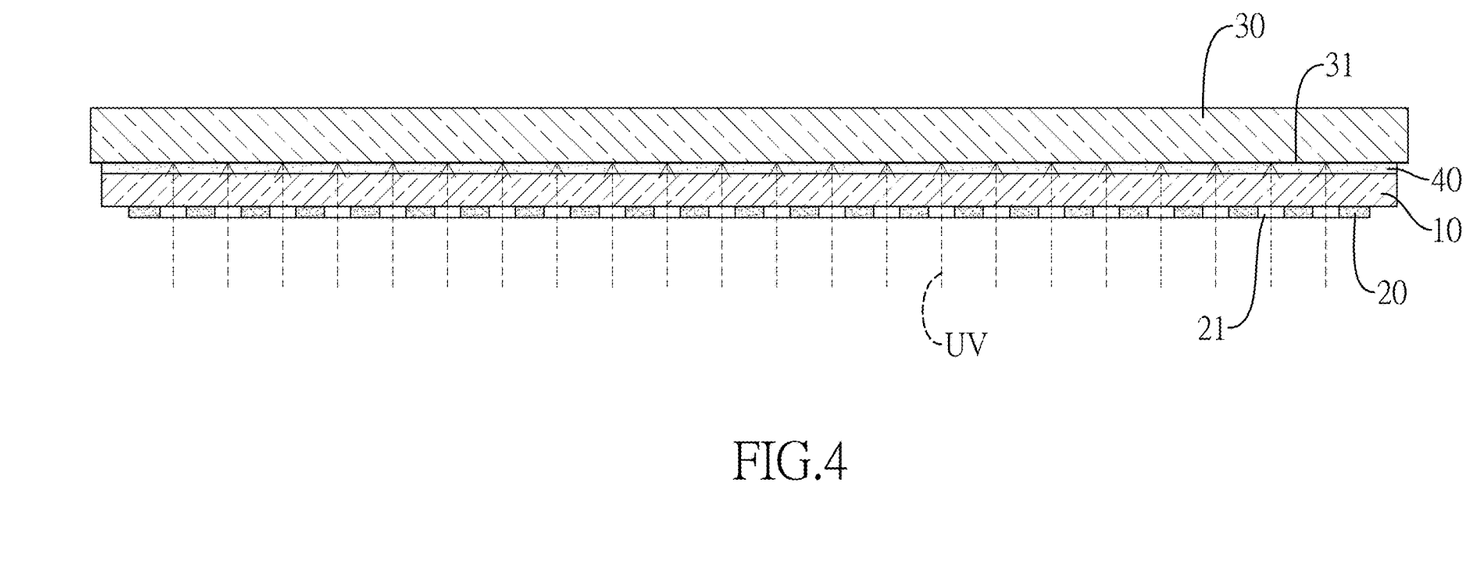
FIG. 4 is a cross-sectional view of the cross-section indicated by A-A in FIG. 2 for observing the touch panel with a heater receiving ultraviolet light irradiation.

Referring to FIG. 4, during the bonding process of the present invention, the ultraviolet light is irradiating from one side of the sensing substrate 10 toward the cover lens 30, and the ultraviolet light can penetrate the sensing substrate 10 through the plurality of openings 21 on the heating electrodes 20. As the optical adhesive 40 is being irradiated, the optical adhesive 40 is effectively cured by the irradiation of ultraviolet light, and the bonding strength between the cover lens 30 and the sensing substrate 10 is enhanced.

Figure 5:
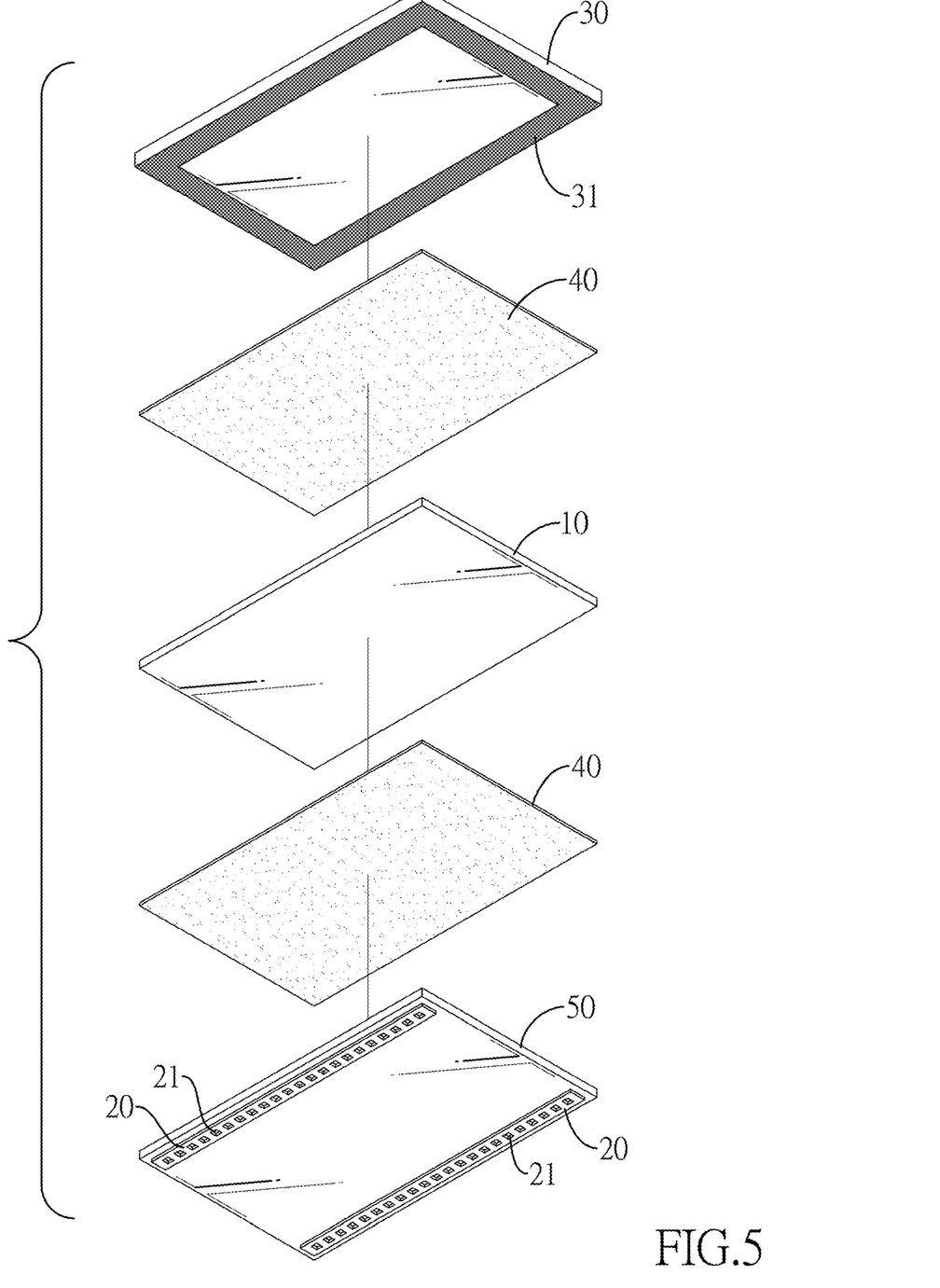
FIG. 5 is an exploded perspective view of another embodiment of the present invention of the touch panel with a heater.
Figure 6:
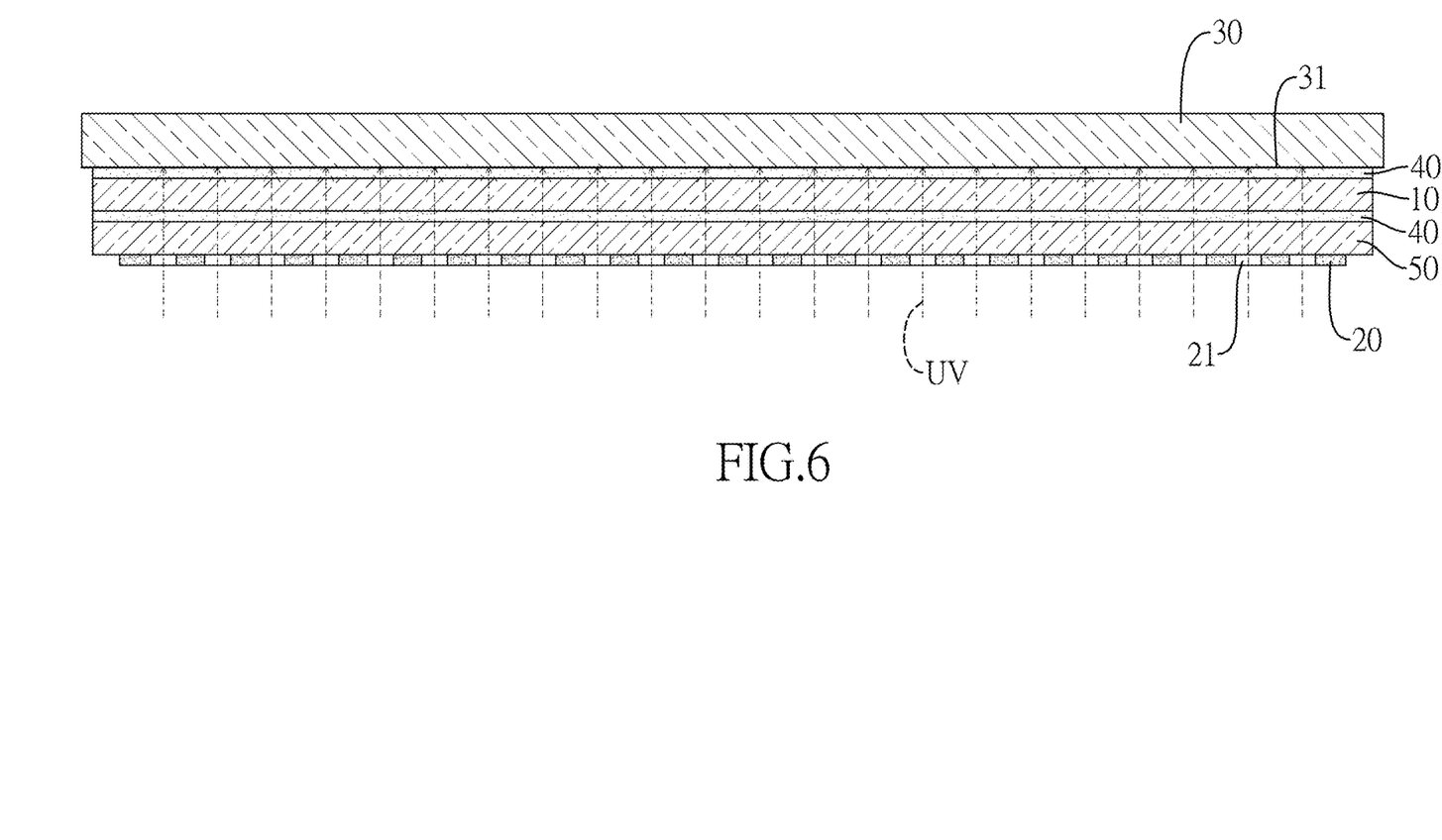
FIG. 6 is a schematic diagram of the touch panel with a heater in FIG. 5 irradiated by ultraviolet light.

Please refer to FIG. 5. According to another embodiment of the touch panel with a heater of the present invention, the at least one heating electrode 20 is also disposed below the sensing substrate 10. However, the difference between the present embodiment and the previous embodiment is that a heating substrate 50 of transparent material is further configured below the sensing substrate 10, and the heating electrode 20 is instead configured on the lower surface of the heating substrate 50 with each heating electrode 20 still having a plurality of openings 21 for the ultraviolet light to pass through and illuminate. The upper surface of the heating substrate 50 is attached to the lower surface of the sensing substrate 10 through the optical adhesive 40. According to FIG. 6, it can be clearly seen that the ultraviolet light is irradiating from one side of the heating substrate 50 toward the cover lens 30. The ultraviolet light can penetrate the heating substrate 50 and the sensing substrate 10 in sequence through the plurality of openings 21 on the heating electrodes 20 and then irradiate to the respective optical adhesive 40 of each layer; the respective optical adhesive 40 of each layer is cured by light irradiation, and the bonding strength between the cover lens 30 and the sensing substrate 10 and between the sensing substrate 10 and the heating substrate 50 is improved.

Figure 8:
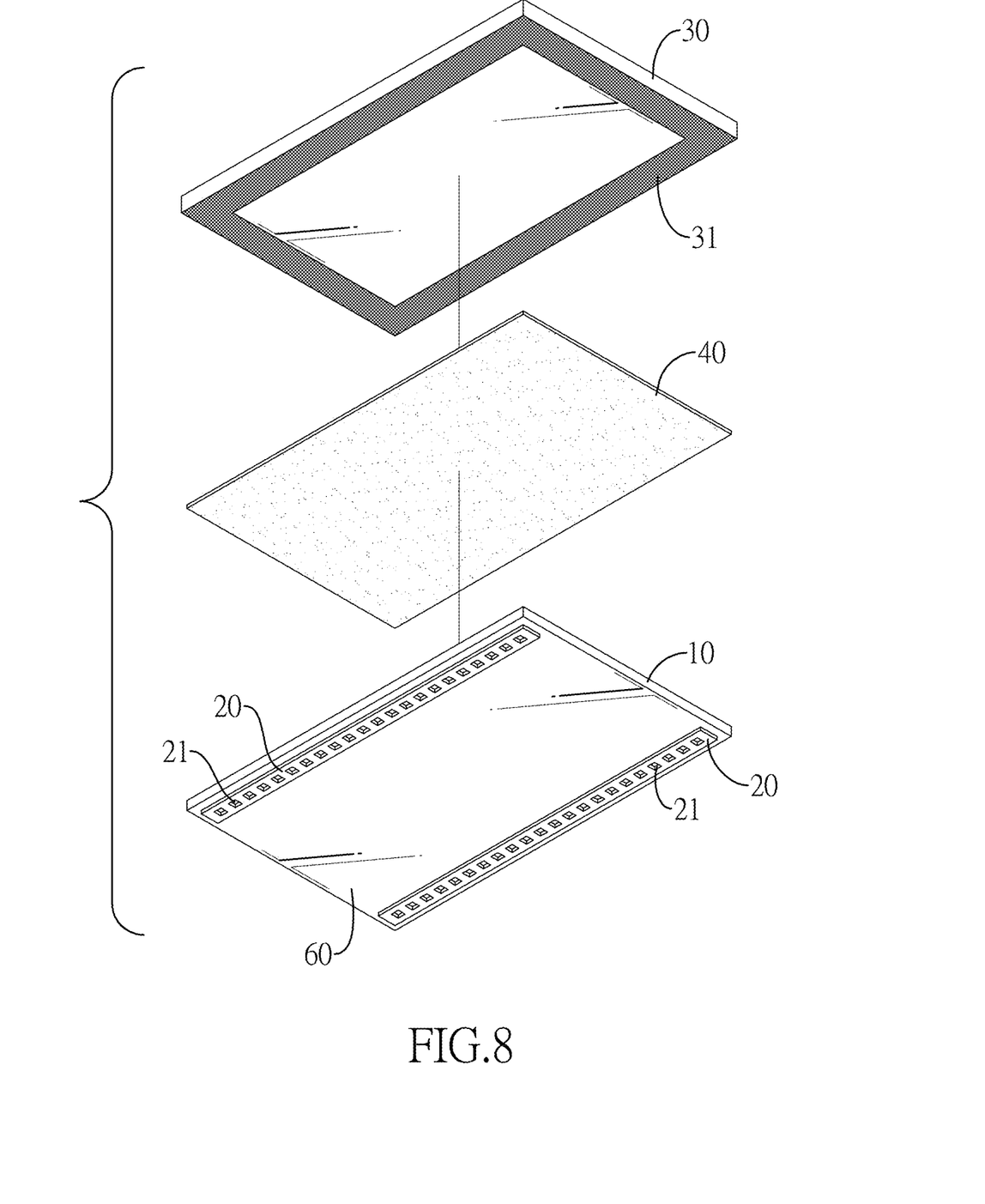
FIG. 8 is a second embodiment of the present invention of the touch panel with a heater.

Please refer to FIG. 8. FIG. 8 is about a second embodiment of the present invention of the touch panel with a heater. The difference between the second embodiment and the first embodiment is that in the second embodiment, a transparent conductive layer 60 is further disposed between the heating electrode 20 and the sensing substrate 10, that is, a transparent conductive layer 60 such as ITO (Indium Tin Oxide), metal mesh, graphene or other transparent thin film conductive layer materials, is further disposed on the lower surface of the sensing substrate 10, and then at least a pair of the heating electrodes 20 are disposed on a lower surface of the transparent conductive layer 60. The at least one pair of the heating electrodes 20 can be applied with a voltage V, so that a current I may flow through the transparent conductive layer 60, and thereby the transparent conductive layer 60 also generates heat.

Please refer to Table 1. Table 1 shows measured values of a 7-inch touch panel with a heater of the present embodiment with respect to various sheet resistances of the transparent conductive layer and under the environment of minus 40° C.

TABLE 1

| Sheet resistance | Applied Voltage V | Measured Current I | Maximum temperature ($T_{max}$) | Time for reaching $T_{max}$. |
|---|---|---|---|---|
| 15Ω/□ | 12 V | 1.36 A | 10° C. | 5 minutes |
| 60Ω/□ | 12 V | 0.43 A | −26° C. | 3 minutes |

In this embodiment, the shape of each heating electrode 20 can be a straight stripe shape, or an L-shape, etc., and the material constituting the heating electrode 20 being opaque conductive material, such as silver paste, is formed on the lower surface of the transparent conductive layer 60 by printing. In this embodiment, a plurality of openings 21 are formed on each of the heating electrodes 20. The sizes and shapes of the openings 21 are not limited, as long as the two ends of the heating electrodes 20 are still connected and the openings 21 do not cause the heating electrodes 20 to form an open circuit. When printing the silver paste material, the openings 21 can be formed at preset positions by not printing the silver paste material thereon, and accordingly, the transparent conductive layer 60 and the lower surface of the sensing substrate 10 are directly exposed through the openings 21 for ultraviolet light irradiation. Referring to FIG. 8, ultraviolet light can irradiate from one side of the sensing substrate 10 toward the cover lens 30, and the ultraviolet light can serially penetrate the transparent conductive layer 60 and the sensing substrate 10 through the plurality of openings 21 on the heating electrodes 20 to reach the optical adhesives 40 to effectively cure the optical adhesives 40 and to strengthen the bonding force between the cover lens 30 and the sensing substrate 10.

Figure 9:
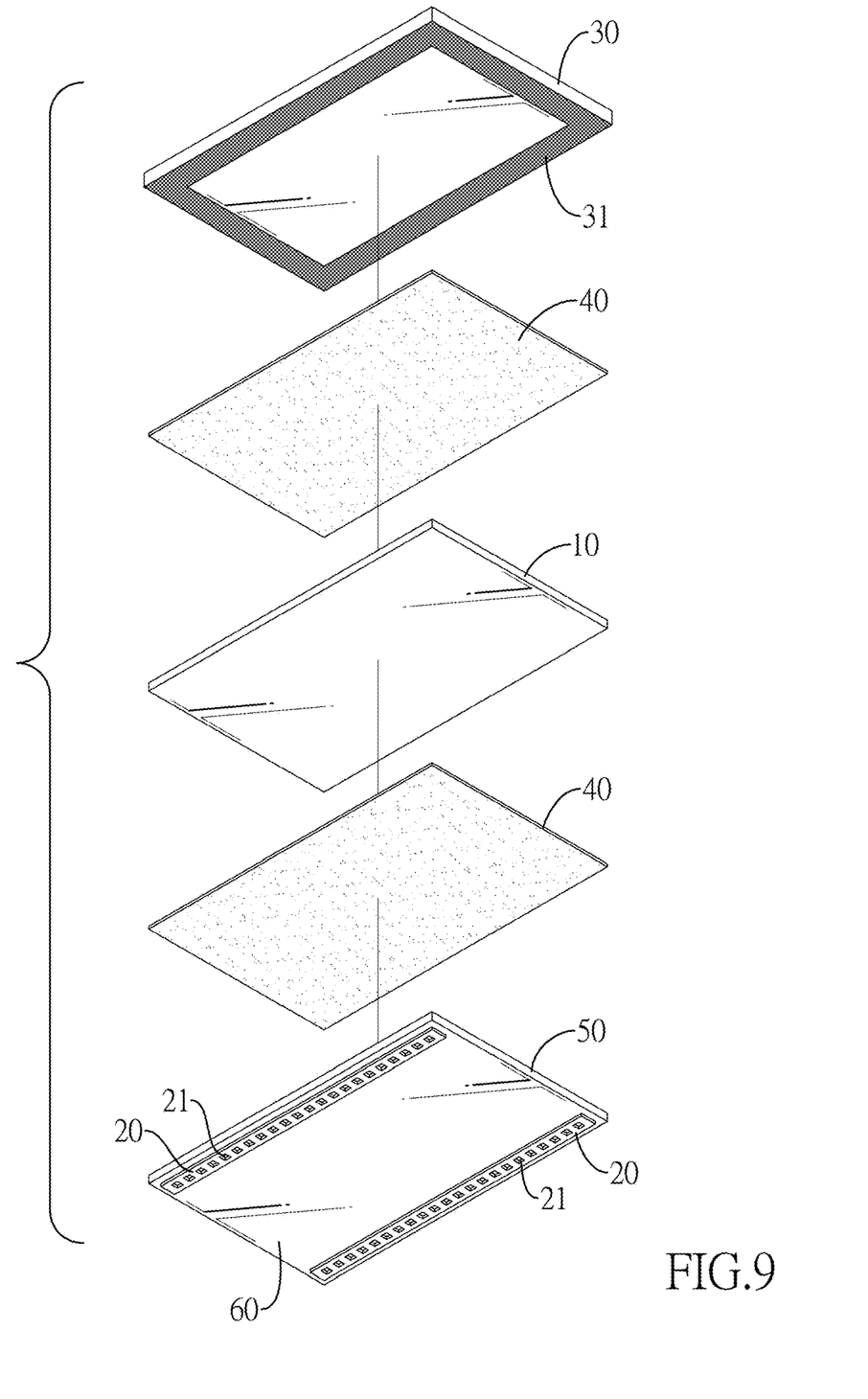
FIG. 9 is a third embodiment of the present invention of the touch panel with a heater.

Please refer to FIG. 9. FIG. 9 is about a third embodiment of the present invention of the touch panel with a heater. The difference between the third embodiment and the embodiment referred to by FIG. 5 is that in the third embodiment, a transparent conductive layer 60 is further disposed between the heating electrode 20 and the heating substrate 50, that is, a transparent conductive layer 60 such as ITO (Indium Tin Oxide), metal mesh, graphene or other transparent thin film conductive layer materials, is further disposed on the lower surface of the heating substrate 50, and then at least a pair of the heating electrodes 20 are disposed on a lower surface of the transparent conductive layer 60. The at least one pair of the heating electrodes 20 can be applied with a voltage V, so that a current I may flow through the transparent conductive layer 60, and thereby the transparent conductive layer 60 also generates heat. Referring to FIG. 9, ultraviolet light can irradiate from one side of the heating substrate 50 toward the cover lens 30, and the ultraviolet light can serially penetrate the transparent conductive layer 60, the heating substrate 50 and the sensing substrate 10 through the plurality of openings 21 on the heating electrodes 20 to reach the optical adhesives 40 to effectively cure the optical adhesives 40 and to strengthen the bonding force between the cover lens 30 and the sensing substrate 10 and between the heating substrate 50 and the sensing substrate 10.

Figure 10:
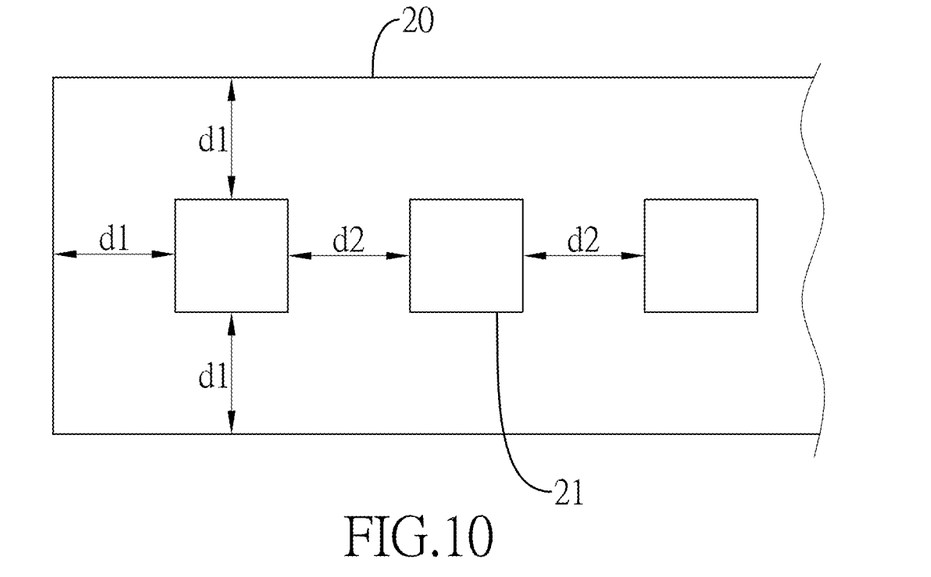
FIGS. 10 and 11 show a fourth embodiment of the present invention of the touch panel with a heater.
Figure 11:
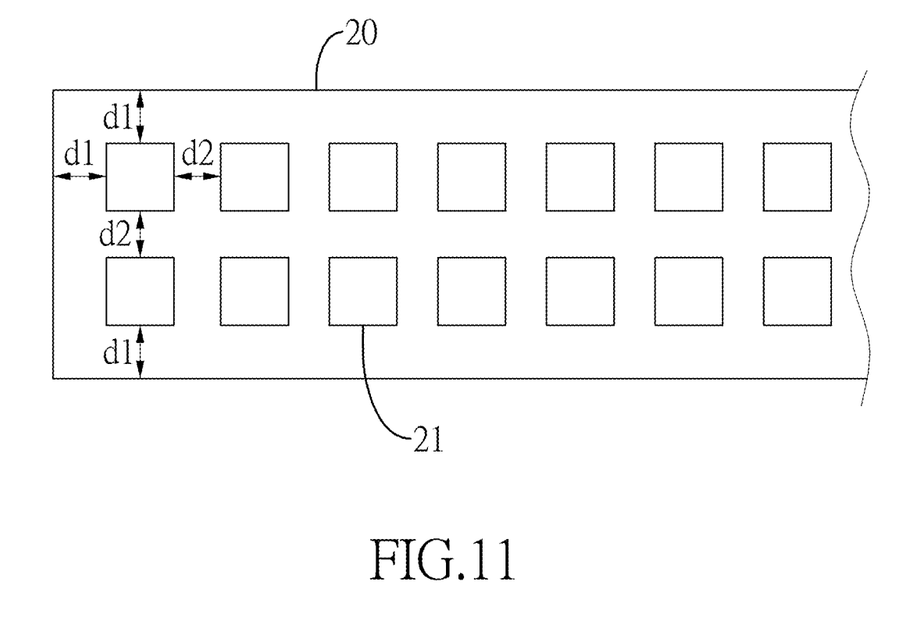

Please refer to FIGS. 10 and 11. FIGS. 10 and 11 show a fourth embodiment of the present invention of the touch panel with a heater. FIG. 10 shows a single row of identical openings 21 and design specifications d1 and d2 on a heating electrode 20. FIG. 11 shows a heating electrode 20 with double rows of identical openings 21 and design specifications d1 and d2. Wherein, the design specification d1 refers to the gap distance between an edge of the heating electrode 20 with its adjacent openings 21, and the design specification d2 refers to the gap distance between two adjacent openings 21, for example: the design specification d1 and the design specification d2 are all less than or equal to 1.8 mm; at the same time, a conducting area ratio (CAR) of the heating electrode 20 can be defined as the ratio between the conducting area of the heating electrode with the openings 20 and the conducting area of the heating electrode without the openings 20. The smaller the conducting area ratio is, the more light will pass through the heating electrode 20. In order to allow enough light to pass through the heating electrode 20, preferably, the conducting area ratio (CAR) should not be greater than 0.84.

Figure 12:
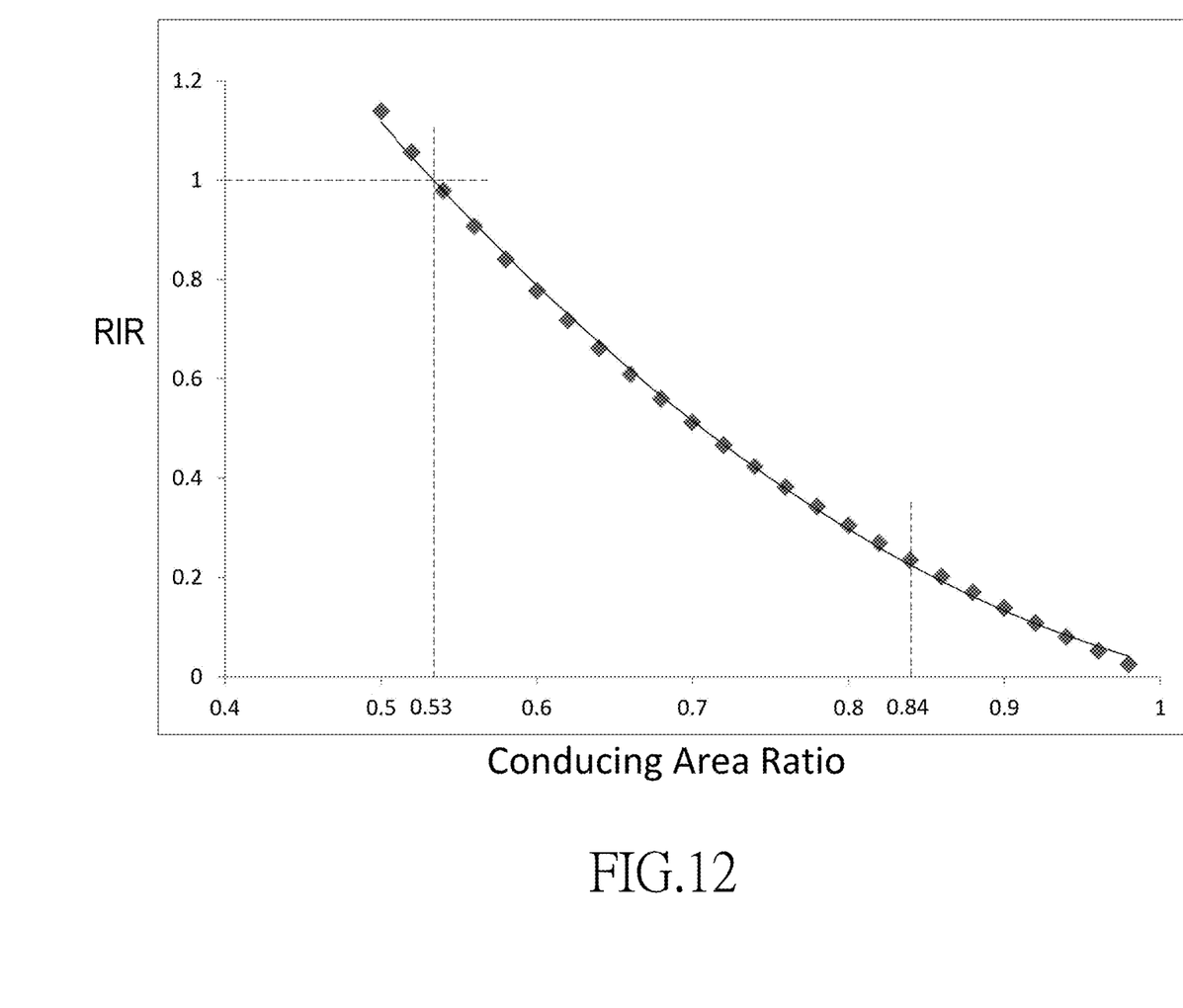
FIG. 12 shows measurement results of a heating electrode.

Please refer to FIG. 12. FIG. 12 is about measurement results of a heating electrode. The horizontal axis represents the conducting area ratio (CAR) of the heating electrode, and the vertical axis represents the resistance increasing rate (RIR) of the resistance (R) of the heating electrode with respect to the conducting area ratio (CAR). The relationship between the conducting area ratio (CAR) of the heating electrode, the resistance of the heating electrode (R), and the rate of increase of the resistance of the heating electrode (RIR) is that the rate of increase of the resistance of the heating electrode (RIR) is equal to the derivative of the resistance of the heating electrode (R) with respect to the conducting area ratio (CAR) of the heating electrode, i.e. RIR=dR/d(CAR).

As can be seen from FIG. 12, when the conducting area ratio (CAR) decreases, the resistance increasing rate (RIR) of the heating electrode 20 will increase accordingly, which means that the resistance of the heating electrode 20 also increases accordingly. Consider applying a fixed voltage V across both ends of a resistor, in such a case, the heat generated by the resistor is inversely proportional to the resistance value of the resistor, accordingly, it is preferred that the resistance increasing rate (RIR) of the heating electrode should not be greater than 1, so as to avoid unexpectedly large resistance (R) of the heating electrode to cause overall insufficient heat generation of the touch panel of the present invention, and to keep the resistance of the heating electrode within an acceptable range thereby. As shown in FIG. 12, when the conducting area ratio (CAR) is not less than 0.53, the resistance increasing rate (RIR) of the heating electrode is not greater than 1.

In the present invention, by forming the openings 21 on each heating electrode 20, the ultraviolet light can penetrate the openings 21 on the heating electrode 20 and irradiate the optical adhesive 40 behind, and thus the curing of the optical adhesives 40 can still be improved in the locations of the heating electrodes 20. In this way, the product quality of a touch panel is improved.

The aforementioned are preferred embodiments of the present invention. It should be noted that for those of ordinary skill in the art, without departing from the principles of the present invention, certain improvements and retouches of the present invention can still be made which are nevertheless considered as within the protection scope of the present invention.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:
1. An optical adhesive bonding enhancing touch panel with a heater including:
  a sensing substrate, having an upper surface and a lower surface, and a plurality of sensing electrodes and signal lines formed on the upper surface;
  a cover lens, having a lower surface, and an opaque light-shielding layer coated along borders of the lower surface of the cover lens to form a light-shielding layer, and the lower surface of the cover lens bonded to the upper surface of the sensing substrate via an optical adhesive layer;
  a heating substrate, bonded to the lower surface of the sensing substrate;
  at least one heating electrode configured under the sensing substrate and printed on a lower surface of the heating substrate, and the at least one heating electrode formed by printing with an opaque conductive material, and a plurality of openings formed on the heating electrode for light to pass through;

wherein the light-shielding layer shields the at least one heating electrode.

2. The optical adhesive bonding enhancing touch panel with a heater as claimed in claim 1, wherein the plurality of openings are evenly disposed on the at least one heating electrode.

3. The optical adhesive bonding enhancing touch panel with a heater as claimed in claim 2, wherein the plurality of openings on the at least one heating electrode have a same size.

4. The optical adhesive bonding enhancing touch panel with a heater as claimed in claim 2, wherein the plurality of openings on the at least one heating electrode have different sizes.

5. The optical adhesive bonding enhancing touch panel with a heater as claimed in claim 2, wherein the plurality of openings on the at least one heating electrode have a same shape.

6. The optical adhesive bonding enhancing touch panel with a heater as claimed in claim 2, wherein the plurality of openings on the at least one heating electrode have different shapes.

7. The optical adhesive bonding enhancing touch panel with a heater as claimed in claim 2, wherein the at least one heating electrode is formed by printing with silver paste.

8. The optical adhesive bonding enhancing touch panel with a heater as claimed in claim 2, wherein the at least one heating electrode is L-shaped.

9. The optical adhesive bonding enhancing touch panel with a heater as claimed in claim 2, wherein the at least one heating electrode is in a shape of a straight strip.

10. An optical adhesive bonding enhancing touch panel with a heater including:
a sensing substrate, having an upper surface and a lower surface, and a plurality of sensing electrodes and signal lines formed on the upper surface;
a cover lens, having a lower surface, and an opaque light-shielding layer coated along borders of the lower surface of the cover lens to form a light-shielding layer, and the lower surface of the cover lens bonded to the upper surface of the sensing substrate via an optical adhesive layer;
at least one heating electrode configured under the sensing substrate and a transparent conductive layer being further disposed between the lower surface of the sensing substrate and the at least one heating electrode, and the at least one heating electrode being disposed on a lower surface of the transparent conductive layer, and the at least one heating electrode formed by printing with an opaque conductive material, and a plurality of openings formed on the heating electrode for light to pass through.

11. The optical adhesive bonding enhancing touch panel with a heater as claimed in claim 10, wherein the plurality of openings on the at least one heating electrode have a same shape and a same size.

12. The optical adhesive bonding enhancing touch panel with a heater as claimed in claim 11, wherein the plurality of openings on the at least one heating electrode have a same gap distance between each two adjacent said openings.

13. The optical adhesive bonding enhancing touch panel with a heater as claimed in claim 11, wherein the plurality of openings on the at least one heating electrode have a same gap distance between an edge of the at least one heating electrode and the openings that are adjacent to the edge.

14. The optical adhesive bonding enhancing touch panel with a heater as claimed in claim 10, wherein the at least one heating electrode has a conducting area ratio that equals to a ratio between a conducting area of a heating electrode with the plurality of openings and the conducting area of the same heating electrode without any openings, and the conducting area ratio is no more than 0.83 and no less than 0.53.

15. The optical adhesive bonding enhancing touch panel with a heater as claimed in claim 1, wherein a transparent conductive layer is further disposed between the lower surface of the heating substrate and the at least one heating electrode, and the at least one heating electrode is disposed on a lower surface of the transparent conductive layer.

16. The optical adhesive bonding enhancing touch panel with a heater as claimed in claim 15, wherein the plurality of openings on the at least one heating electrode have a same shape and a same size.

17. The optical adhesive bonding enhancing touch panel with a heater as claimed in claim 15, wherein the plurality of openings on the at least one heating electrode have a same gap distance between each two adjacent said openings.

18. The optical adhesive bonding enhancing touch panel with a heater as claimed in claim 15, wherein the at least one heating electrode has a conducting area ratio that equals to a ratio between the conducting area of a heating electrode with the plurality of openings and the conducting area of the same heating electrode without any openings, and the conducting area ratio is no more than 0.83 and no less than 0.53.

\* \* \* \* \*